United States Patent [19]

Waltrip, Jr. et al.

[11] Patent Number: 4,989,336

[45] Date of Patent: Feb. 5, 1991

[54] TRIM POSITIONING DEVICE

[76] Inventors: William A. Waltrip, Jr.; Raynette A. Waltrip, both of 341 Raymond Ave., San Jose, Calif. 95128

[21] Appl. No.: 386,488

[22] Filed: Jul. 28, 1989

[51] Int. Cl.[5] .......... G01B 1/00

[52] U.S. Cl. .......... 33/526; 269/905; 269/904

[58] Field of Search .......... 33/526, 197, 194, 527; 269/905, 904

[56] References Cited

U.S. PATENT DOCUMENTS

| | | | |
|---|---|---|---|
| 1,336,157 | 4/1920 | Read | 33/197 |
| 3,086,295 | 4/1963 | Dalpe | 33/194 |
| 3,086,295 | 4/1963 | Dalpe | 33/194 |
| 3,386,177 | 6/1968 | Koscielski | 33/526 |
| 3,456,702 | 7/1969 | Johnson | 269/904 |
| 4,282,615 | 8/1981 | Dale . | |

*Primary Examiner*—William A. Cuchlinski, Jr.
*Assistant Examiner*—William C. Dowling
*Attorney, Agent, or Firm*—Michael J. Hughes

[57] ABSTRACT

The invention is a trim positioning tool (10) including a trim guide portion (12), a door frame guide (20) and a trim headpiece length marking piece (22). The trim guide portion (12) includes a trim width spacer (14), trim with spacer standoffs (16) and a wall guide (18). The primary usage of the tool (10) is in the position of trim strips and stop strips during the installation of wooden door frames in residential and commerical construction. As so used, the tool (10) performs three separate functions. The tool (10) is used as a measuring device to mark the position for an initial piece of trim. The tool (10) is used to position trim at a proper setback distance and to help hold the trim in place while it is fastened. The tool (10) is also used to position door stop strips.

15 Claims, 3 Drawing Sheets

TRIM POSITIONING DEVICE

TECHNICAL FIELD

The present invention relates generally to the field of carpentry and more particularly to the positioning of trim material as a part of building construction and repair. The predominant current usage of the tool is the positioning of trim strips and stop strips around door frames.

BACKGROUND ART

Carpentry is one of oldest fields of technology. Over the centuries, a number of devices have been developed to mark materials for cutting or positioning. Perhaps the simplest and most versatile of these is the simple square. Indeed, with no other tools except a square, a measuring device such as a ruler or tape measure, and a marking utensil such as a pencil, almost all measuring necessary to the field of carpentry could be accomplished. But, for many applications, a considerable sacrifice of accuracy and time would result from the use of only those tools. Therefore, more specialized tools have been developed. These have ranged from adjustable squares to special square adapters for marking stair risers for cutting.

Also, devices for temporarily holding pie of materials in place while they are permanently fastened have been developed. The most common of these is the clamp.

However, while carpentry is an ancient art, the field has not remained entirely static. Modern trends have encouraged artisans to try to find ways to work more quickly and more precisely. An example of a device which has helped to advance the field is found in U.S. Pat. No. 3,086,295 issued to Raymond S. Dalpe wherein a device for scribing doors so that they may be accurately cut to fit a door opening is taught.

A device for protecting surfaces from damage while fasteners are attached is described in U.S. Pat. No. 4,282,615 issued to Dale M. Tom. The Tom device includes, as an incidental feature, a mark correctly positioned to allow the tool to be used as a measuring device, for the single purpose of indicating the correct set back length for door trim. The Tom device is used simply as a measuring device such as a ruler when it is applied to the application of door trim.

One area of modern carpentry that poses a particular problem has been the sizing and placing of door trim strips. Modern construction techniques require that trim strips be placed around practically every wood framed door to conceal the junction between the door frame itself and the support framework to which it is attached. The three pieces of trim required must all be equally set back from the door edge to be attractive to the eye. Further, the pieces of trim must meet at the top two corners of the door, where they are cut with 45 degree angle ends, with no overlap or space between the parts. Meeting these two requirements simultaneously can be quite difficult. An error of only a small fraction of an inch in the length of the headpiece or the set back of any of the trim pieces can produce very unattractive results. It is especially difficult to accurately measure for the length of the headpiece, because this must be done before any of the , pieces are in place. There are, therefore, no clear points between which a length measurement can be taken at that point of the construction.

After the trim headpiece is successfully cut to the proper length, the trim strips must be positioned properly and held in place until they are fastened permanently.

Finally, for door frames that are not furnished with pre-installed door stop strips, these must be installed. Precise positioning of the stop strip is necessary for both aesthetic and functional reasons, In the past this has involved numerous operations and considerable inaccuracy using prior art methods.

All of these processes have been accomplished by using a simple measuring device to measure for positioning, and then by marking the correct locations, and then by attempting to hold the pieces on the marks while they are fastened down.

No prior art method is presently known which can quickly and accurately provide a guidemark for measuring door trim headpiece trim length. Nor is a prior art method known which can position trim strips quickly and accurately in place. Nor is a prior art method known which can quickly and accurately position door stop strips.

DISCLOSURE OF INVENTION

Accordingly, it is an object of the present invention to provide a tool which can quickly and accurately position trim strips for fastening.

It is another object of the present invention to provide a tool which will allow the user to quickly and accurately scribe marks for measuring trim strip header length.

It is yet another object of the present invention to provide a tool for positioning door stop strips inside a door frame.

It is a further object of the present invention to provide a tool which will reduce the number of operations required to install door trim strips and stops.

It is still another object of the invention to provide a tool for holding trim strips precisely in position for nailing or otherwise affixing them to the frame.

It is yet another object of the present invention to provide a tool which can be easily and inexpensively manufactured.

Briefly, the preferred embodiment of the present invention is a tool comprised of several pieces of a rigid material joined together to form a unitary irregularly shaped component with no movable parts.

The tool includes a guide for spanning and holding door trim strip pieces in position. The tool also includes a spacer of the correct width to properly position the trim strip guide. The preferred embodiment of the tool also includes a door frame edge guide of the proper dimension to position a door stop strip. The preferred embodiment of the invention also includes a trim headpiece length marking element of the correct dimensions to allow the user to mark the proper headpiece position for measuring.

When the embodiment is utilized, the user would first employ the trim headpiece length marking piece to scribe marks which will accurately show where the headpiece will be positioned. The distance between these marks will then be measured, and that measurement will be used to cut the headpiece to length. The tool is then turned to be used as a guide to position the trim strips. The trim guide is positioned over the trim strip and the door frame edge guide is pushed against the door frame. This automatically positions the trim strip at the correct set back position. The tool can be slid along the length of each trim strip as that strip is nailed to accurately position the strip along its entire length.

Finally, if a door stop strip is to be installed, the tool is left in the same position as was used to install the trim strips. The stop is pushed against the end of the door frame edge guide to be accurately positioned, and is then nailed in place.

An advantage of the present invention is that the proper length for a door trim strip headpiece can be measured more accurately than with conventional tools.

Another advantage of the present invention is that door trim strips can be positioned and held in place in a single step.

A further advantage is that trim strips can be positioned more accurately than by first marking and then placing the edge of the piece on the mark.

Yet another advantage of the present invention is that the tool helps to hold a trim strip while the user nails the strip in place.

Yet another advantage is that a stop strip can be positioned without the need for any measurement or marking.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT THE INVENTION

The best presently known mode for carrying out the invention is a device formed from several pieces of a rigid material joined together to form an irregularly shaped tool. The tool is intended to be used in the installation of wooden door trim strips and stop strips. The several dimensions of the tool of the present invention are determined such that the width and maximum height of door trim, the length of the trim setback, the thickness of the door, and the positioning of the trim strip headpiece are set into the tool at the time of manufacture. The predominant expected usage of the inventive tool is in the installation of premanufactured door frames into residential and commercial buildings. In this field, the dimensions pertinent to this invention have become standardized. It is expected that only a few tools according to the present invention will serve the user to improve the installation of all such standardized door applications.

Figure 1:
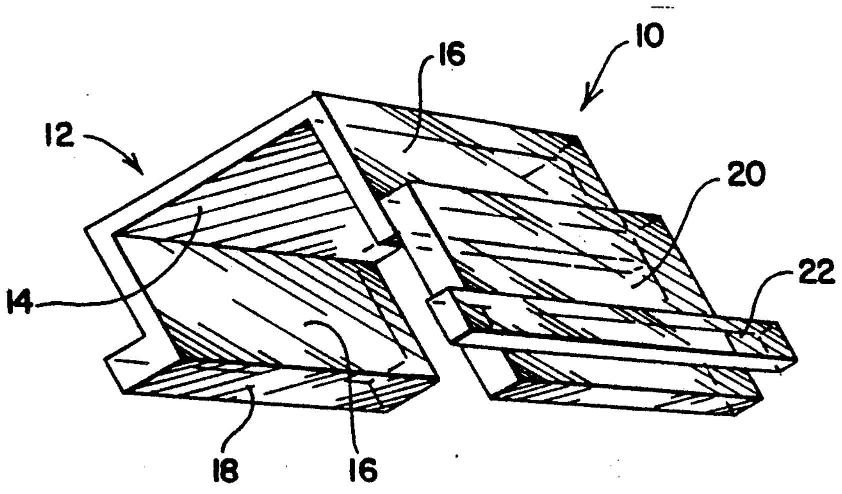
FIG. 1 is a perspective view of a door trim positioning device according to the present invention.

The door trim and stop positioning device of the present invention is illustrated in a perspective view in FIG. 1 and is designated therein by the general reference character 10. The tool 10 of the present invention can be made using any rigid material that will withstand the rigors of the intended usage. The parts of the tool 10 can be joined together by any conventional means. For instance, the present invention could be made using steel parts and the parts could be joined together by welding. Further, the several individual parts of the tool 10 could be extruded, molded, or formed from a single piece or from any number of pieces of material. The preferred embodiment of the present invention is made from plexiglass. Four of the individual parts are extruded as a single piece of plexiglass. The remainder of the individual parts are joined by chemical welding using acetone. Alternatively, the entire tool 10 may be unitarily formed by a mechanism such as casting or plug molding. All of the materials and processes used in the making of the preferred embodiment of the present invention are well known and commonly practiced.

The tool 10 of the preferred embodiment of the present invention includes a trim guide 12. The trim guide 12 is designed to fit over a piece of door trim and to hold it in place. The use of the tool 10 to position door trim is discussed hereinafter in connection with FIG. 5. The trim guide 12 is comprised of a trim width spacer 14, two trim width spacer standoffs 16, and a wall guide 18. In the preferred embodiment of the present invention the trim width spacer 14, the two trim width spacer standoffs 16, and the wall guide 1 8 are all extruded as a single piece of plexiglass. The tool of the preferred embodiment of the present invention also includes a door frame edge guide 20, and a trim headpiece length marking piece 22.

Figure 2:
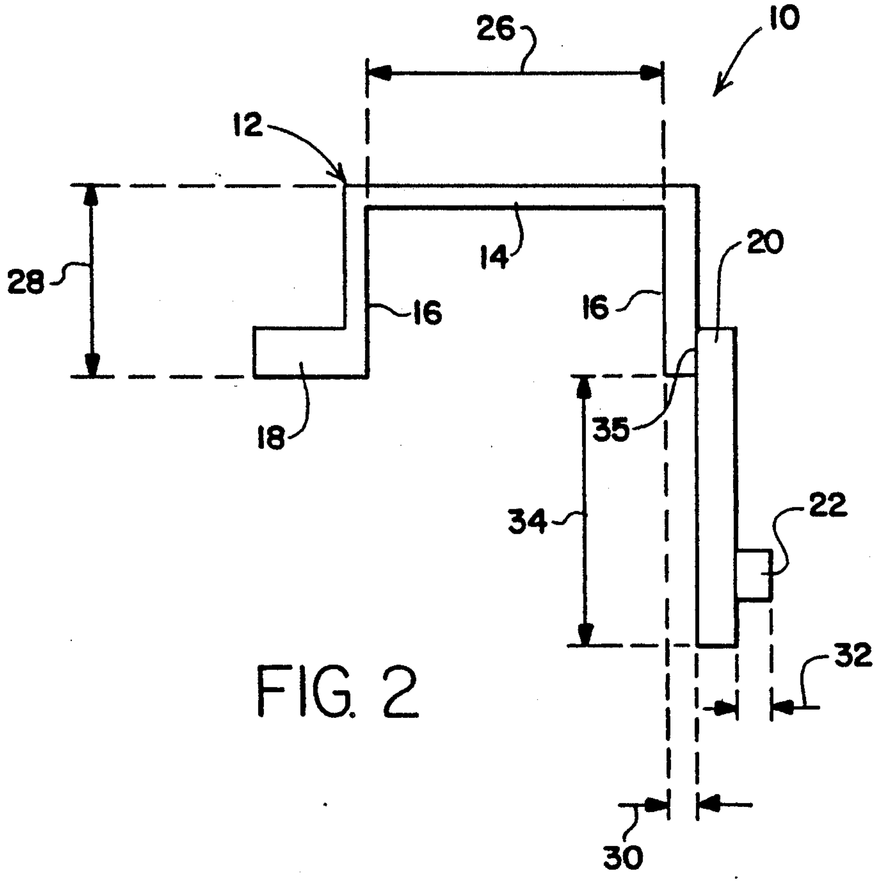
FIG. 2 is a plan edge view of the preferred embodiment of the present invention.

FIG. 2 is an edge view of the tool 10 of the preferred embodiment of the present invention. Several of the spans which are important to the functionality of the preferred embodiment of the present invention are illustrated in FIG. 2. These include a total tool width span 24, a trim width spacer span 26; a standoff height span 28; a trim setback span 30; a headpiece length marker width span 32; an overlap span 33; and a stop setback span 34.

Figure 3:
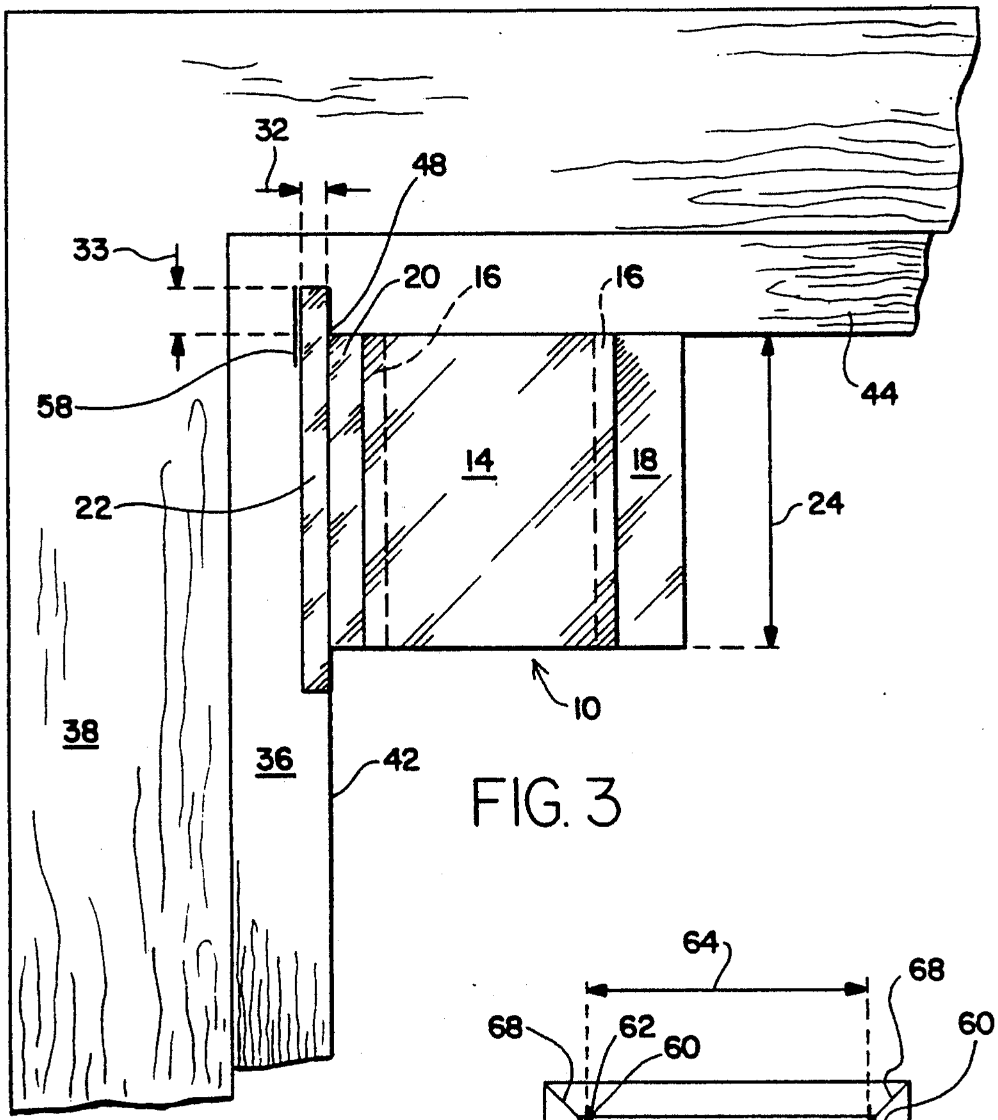
FIG. 3 is a representation of the use of the device to mark a doorway for trim headpiece length.
Figure 6:
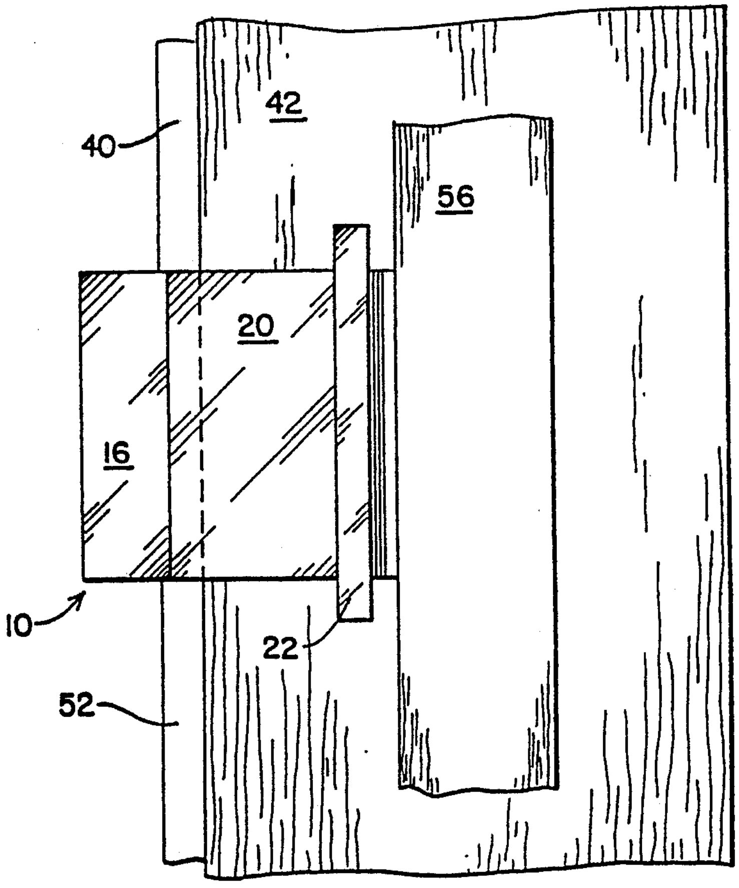
FIG. 6 is a representation of the use of the device to position a door stop strip.

The trim width space span 26 of the trim width spacer is selected such that a piece of door trim will fit between the trim width spacer standoffs 16. The standoff height span 28 of the trim width spacer standoffs 16 must be sufficient that the tallest piece of door trim anticipated will fit beneath the door trim guide 12. The trim setback span 30 is the width of the trim width spacer standoff 16 to which the door frame edge guide 20 is attached. The trim setback span 30 is determinative of the distance a piece of door trim will be set back from the edge of a door frame. The headpiece length marker width span 32 of the headpiece length marker is of the same dimension as the trim setback span 30. The necessity of this relationship will become apparent as the use of the inventive tool 10 to measure for trim headpiece length is discussed hereinafter in connection with FIG. 3 and 1 FIG. 4. The overlap span 33 cannot be seen in the orientation of FIG. 2 but is shown in FIG. 3. The overlap span 33 is the distance that the trim headpiece length marking piece 22 extends beyond the door frame edge guide 20. Ordinarily, this distance will be double that of the marker width span 32. The stop setback span 34 is the span of the door frame edge guide 20 that is exposed below the junction 35 of the edge guide 20 and the trim width spacer standoff 16. The use of the tool 10 to position door stop strips is discussed hereinafter in connection with FIG. 6.

In summary, as viewed from the edge view of FIG. 2, the trim width spacer standoffs 16 are parallel to each other and are perpendicular to the trim width spacer 14. The trim width spacer standoffs are separated by the trim width spacer span 26. The wall guide is perpendicular to the trim width spacer standoff 1 to which it is affixed and is aligned therewith such that no part of the wall guide 18 extends past the trim width spacer standoff 16 in a direction away from the trim width spacer 14. The door frame edge guide 20 is parallel to the trim width spacer standoffs 16, and overlaps the trim width spacer standoff 16 to which it is attached at the junction 35 to provide for the attachment thereto. The door frame edge guide 20 and the wall guide 18 are attached to their respective trim width spacer standoffs 16 such that they are opposed to each other on the outside of the trim guide 12. Regarding the dimension not seen in the edge view of FIG. 2, as can be seen in the view of FIG. 1, the trim width spacer 14, the trim width spacer standoffs 16, the wall guide 18, and the door frame edge guide 20 all share a common dimension, namely the tool width span 24 (FIG. 3). The headpiece length marking element 22 is oriented parallel to the common dimension of the trim width spacer 14, the trim width spacer standoffs 16, the wall guide 18, and the door frame edge guide 20. The trim width spacer is rigidly affixed to the side of the door frame edge guide 20 which is opposite the wall guide 18 and is oriented parallel to the tool width span 24 dimension. The trim width spacer 14 is longer than the trim width span 24 such that the trim width spacer 14 overlaps the door frame edge guide 20 at each end by the overlap span 33, as discussed previously. It should be noted that any span or dimension not discussed specifically herein is not critical to the function of the invention 10, and any variations therein would be cosmetic only. Details of spans and relationship of parts not described in this paragraph but which are relevant to the function of the inventive tool 10 are discussed in detail elsewhere herein.

The tool 10 is adapted for use particularly on a conventional door frame 36, portions of which are illustrated in FIGS. 3, 4, 5 and 6. The door frame 36 is enclosed within a door frame support framework 38, such as a wall, and will ordinarily include those decorative strips of material referred to as rim 40.

The door frame 36 typically includes a pair of opposed vertical members 42 connected at the top by a horizontal top member 44 and, optionally, at the bottom by a sill 46. In many applications, especially in the interior of a building, the sill 46 is dispensed with and the floor provides lower end spacing to the vertical members 42. At the top of the door frame 36 the vertical members 42 intersect the top member 44 at a pair of inside corners 48. As seen in FIG. 3, these are typically right angle corners aligned with the top edges of the vertical members 42, and show a horizontal intersection line (see FIG. 3). One of the purposes of the trim 40 is to mark and cover up the intersections among the portions of the door frame 36 with other portions thereof and also with the support framework 38. It is considered aesthetically pleasing to have the final appearance of the trim 40 present a diagonal intersection rather than horizontal intersections, thus forty-five degree intersections among the members of the trim 40 are desirable. This also enhances structural stability.

The trim 40, for a typical door frame 36, includes a headpiece 50 and a pair of vertically arrayed side pieces 52. The headpiece 50 extends horizontally across the top member 44 and intersects the side pieces 52 at each end of the headpiece 50 at a pair of diagonal junctions 54. The diagonal junctions 54 appear at a forty-five degree angle with respect to the axes of the door frame.

A final element of the door frame 36 which may need to be positioned in some cases, is a door stop 56. The door stop 56 is positioned along one of the vertical members 42 and a arrest the door when it is in its desired closed position alignment.

FIG. 3 is a representation the inventive tool 10 positioned against the typical door frame 36 and door frame support framework 38 so as to be used to mark the frame 36 for measurement of the top trim strip (headpiece) 50. The tool width span 24 is the width of the trim guide 12 and the door frame edge guide 20. The tool width span 24 can be of any length that allows the tool 10 to be easily handled by the user, gives the tool 10 sufficient structural integrity and results in economical manufacture.

A preferred embodiment of the door trim and stop positioning device 10, specifically adapted for positioning trim 40 having a width of 3.81 cm (1 and ½ in) at an offset from the interior edge of the door frame 36 of 0.48 cm (3/16 in) will have the following dimensions. The tool width span 24 will be 5.72 cm (2 and ¼ in). The trim width spacer span 26 will be 3.97 cm (1 and 9/16 in). The standoff height span 28 will be 2.22 cm (7/8 in). The trim setback span 30 will be 0.48 cm (3/16 in). The headpiece length marker width span 32 will be 0.48 cm (3/16 in). The overlap span 33 will be 0.95 cm (3/8 in). The stop setback span 34 will be 3.49 cm (1 and 3/8 in).

Various modifications may be made to the invention without altering its value or scope. For example, the preferred embodiment has been described above as having no movable parts. Anyone skilled in the art could easily see how the device could be modified so as to make one or more of the dimensions of the tool adjustable, should this later be found to be a desirable feature.

Another conceivable change would be to alter the contour of the device and thus to alter its appearance. This could be accomplished by varying some of the dimensions of the device that do not contribute to its function.

All of the above are only some examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The application of door trim 40 is one of the most tedious jobs facing a carpenter engaged in building construction. It is cumbersome to handle the several tools and measuring devices required while manually holding the trim strips 50 and 52 in position and simultaneously attempting to nail the trim strip down. Further, the difficulty of measuring to the headpiece 50 often results in either wasted time and materials or poorly joined corners. Therefore, it is expected that a device which improves accuracy, helps to hold the pieces in place, and reduces the number of operations involved will find widespread acceptance in the industry.

Figure 4:
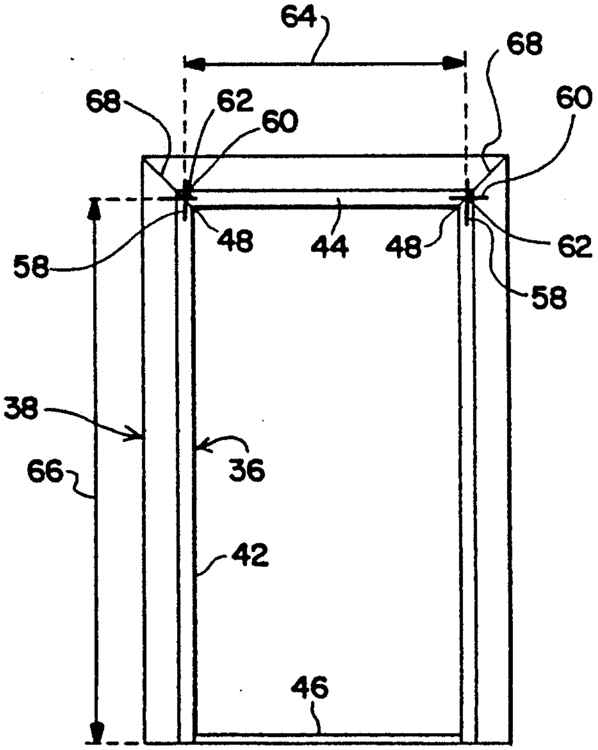
FIG. 4 is a diagram of a door frame marked With the invention and ready to measure.

In a typical door frame installation the tool 10 of the present invention is first used to mark the door frame 36 as shown in FIG. 4. This enables the user to measure the proper length for a first piece of trim 40. The tool 10 is placed against one of the upper inside corners 48 of the door frame 34 with the door frame edge guide 20 positioned flush against the inside corner 48 such that the trim headpiece length marking piece 22 is vertical and flush against the edge of the door frame 36 facing the user. A vertical mark 58 is then scribed by the user along the edge of the trim headpiece length marking piece 22. The tool 10 is then inverted and placed in the opposing upper door frame corner 48 and another vertical mark 58 is scribed in that corner 48.

The two vertical marks 58 are placed as depicted in FIG. 4. The tool 10 is then turned so that the trim headpiece length marking piece 22 is horizontal and the tool 10 is placed against one of the upper inside corners 48 of the door frame edge guide 20 positioned flush against the inside corner 48. A horizontal mark 60 is then scribed by the user along the edge of the trim headpiece length marking piece 22. The horizontal mark 60 intersects the vertical mark 58 at a marking point intersection 62. The tool 10 is then placed in the opposing upper door frame corner 48 and a second horizontal mark 60 is scribed in that corner 48. The second horizontal mark 60 intersects the vertical mark 58 at a second marking point intersection 62. The distance between the two marking point intersections 62 is the headpiece length span 64. The headpiece length span is then measured by conventional means and the resulting measurement is used to cut a trim headpiece 50 to length with 45 degree cut ends using a conventional miter saw. The headpiece length span 64 measured represents the bottom edge length of the headpiece 50, with the outwardly angled cuts resulting in the upper edge length being somewhat greater.

The marking point intersections 64 are also utilized to define the minimum vertical dimensions of the trim side pieces 52. In this instance the distance between the bottom of the door frame 36 (usually the floor) and the marking point intersections 64 define a side piece length span 66. (See FIG. 4) The side pieces 52 are then cut with flat bottom edges and forty-five degree angled top edges so as to mate with the ends of headpiece 50.

Alternatively, the horizontal marks 60 may be omitted, until needed for the side piece measurements, and the headpiece length span 64 may be measured between the vertical marks 58 along the door frame horizontal top member 44. This alternative method may result in a measurement that is not quite as accurate, but it may be less time consuming.

If the alternative method is used, the headpiece 50 is actually installed after cutting and the side piece spans 66 are measured from the points where the headpiece 50 intersects the vertical marks 60. This has the advantage of assuring that the side pieces 52 will align with the headpiece 50 as actually cut.

Figure 5:
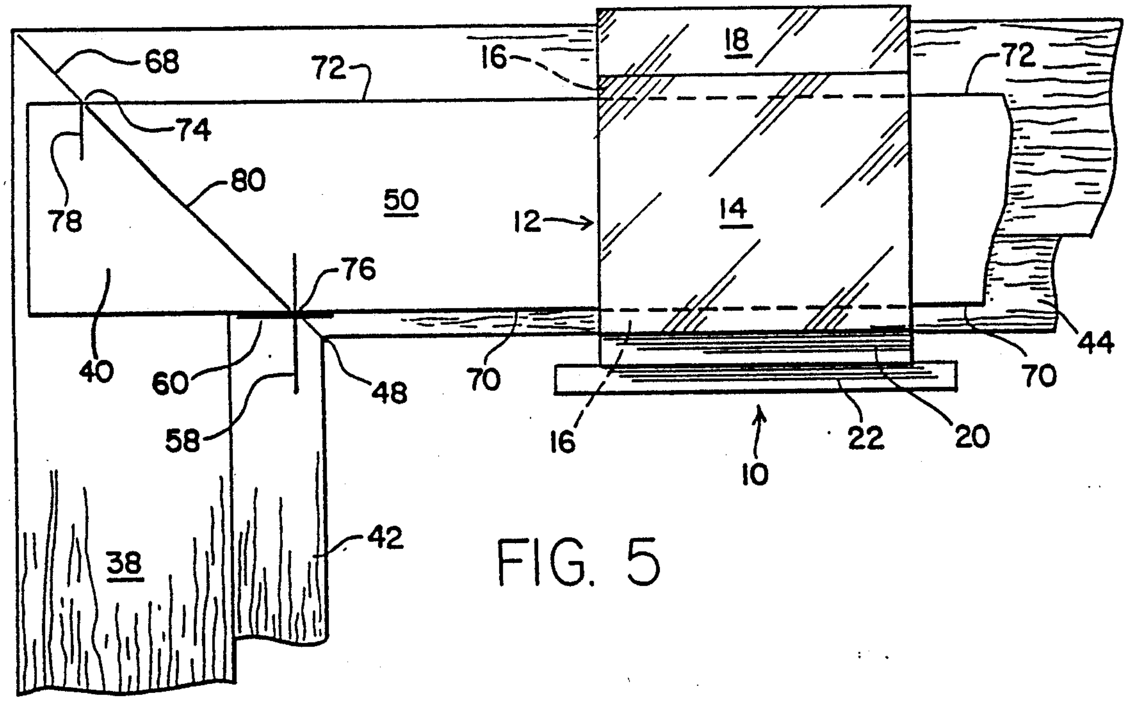
FIG. 5 is a representation of the use of the device to position a trim strip on a door frame.

A second alternative method that may be employed by a user that does not have access to a miter saw or a 45 degree square is to scribe a diagonal mark 68 from each of the door frame inside corners 48 through the marking point intersections 62 as depicted in FIG. 5. The actual headpiece 50, having a bottom edge 70 and a top edge 72, is then used to determine the cutting patter. The trim headpiece 50 is positioned horizontally on the door frame horizontal top member 44, preferably using the tool 10 to hold it in the proper horizontal orientation, spaced from the inside edge of the door frame top member 44, with the headpiece bottom edge 70 positioned on the marking point intersection 62 and with both the headpiece bottom edge 70 and the headpiece top edge 72 intersecting the diagonal marks 68 at a top intersection 74. An inside corner mark 76 is then fond and marked on the headpiece 50 at each intersection of the headpiece bottom edge 70 and the diagonal marks 68 (which is the marking point intersection 62) and an outside corner mark 78 is found and marked on the headpiece 50 and the door frame support framework 38 at each intersection of the headpiece top edge 70 and the diagonal marks 68.

A cutting line 80 is then drawn on the headpiece 50 between each inside corner mark 76 and the corresponding outside corner mark 78 using a conventional straight edge as a guide. The headpiece 50 is then cut along the cutting lines 80.

Similarly, the side pieces 52 are also marked and cut using the marking point intersection 62 and the diagonal mark 68 to locate corresponding inside corner marks 76 and outside corner marks 78 on the side pieces 52. A cutting line 80 is then marked on each side piece 52 and the cut is made accordingly.

An advantage of the second alternate marking method is that it is effective even if the widths of the headpiece 50 and side pieces 52 do not completely correspond.

The top piece of trim (the headpiece) 50 is then positioned using the tool 10 as shown in FIG. 5. The trim guide 12 is placed over the headpiece 50 with both the door frame edge guide 20 and the adjacent trim width spacer standoff 16 flush against the door frame 36. The inside corners 70 of the headpiece 50 are positioned at the marking point intersections 62. The headpiece 50 is then nailed in place. The tool 10 can be slid along the length of the headpiece 50 as the headpiece 50 is nailed to ensure that the headpiece 50 is properly positioned along its entire length.

The side pieces 52 of the trim 40 are then cut to length. It is noted the length measurements on the side pieces 52 are not as critical as is the length measurement of the headpiece 50 since any very small error can be positioned at the floor level and will not be noticeable. Also, it may be easier to mark the side pieces 52 once the headpiece 50 is installed, since an uncut piece of trim 40 can simply be held up against the door frame 38 and marked at the headpiece inside corner 76 and/or the headpiece outside corner 78. The side pieces of the trim 52 are then positioned using the tool 10 as described above and nailed in place.

The final step is to install a stop strip 56. The stop strip 56 is the piece against which a door will close and which limits the travel of a door. The tool 10 remains positioned exactly as it was in the procedure immediately preceding this step. The trim guide 12 is over the side trim strip 52, and the door frame edge guide 20 is flush against the door frame 36. The stop strip 56 is then positioned by placing it against the door frame edge guide 20 and is nailed in place. Again, the tool 10 can be slid along the length of the side pieces 52 as the stop 56 is nailed.

Thus, all of the trim and stop strips which need to be applied in a field installation of a door frame 36 are accomplished with fewer steps and greater accuracy than can be done using conventional measuring, marking, and manual positioning techniques. For these and other reasons, it is expected that the utility and industrial applicability of the invention will be both significant in scope and long lasting in duration.

We claim:

1. A tool for positioning a selected workpiece at a consistent distance from an edge, comprising:

a workpiece guide portion including a rigid member having a cross section in the shape of an inverted "U", a right leg portion and a left leg portion of said inverted "U" being separated by a span slightly greater than the width of the selected workpiece such that the selected workpiece fits within the guide portion, the selected workpiece being a segment of door trim as used in he building construction trades;

an edge guide including a rigid protruding member affixed to said workpiece guide portion such that said protruding member is arrayed outwardly from and in a plane parallel to that of an inner surface of said left leg portion, said protruding member extending beyond the selected workpiece when the workpiece is positioned within the guide portion, said protruding member further being positioned such that it is displaced from said interior edge of said left leg portion by a standard setback distance for said door trim from the edge of a door frame as used in the building construction trade; and means for positioning said protruding member at a desired distance from said inner surface of said left leg portion."

2. The tool of claim 1 wherein:

said means for positioning said rigid protruding member includes a thickness of said left parallel leg of said inverted "U".

3. The tool of claim 1 wherein:

a segmental portion of door trim is held in position within the tool at said setback distance in such a manner that the remainder of said segment is also held in such position, said remainder being accessible to a user for affixation to said door frame.

4. The tool of claim 1 and further including:

a left marking protrusion and a right marking protrusion attached to said protruding member for facilitating the marking of selected spans from the edge, and particularly for marking corner spacing positions.

5. The tool of claim 4 wherein:

said left and right marking protrusions are adapted for marking at least a setback span and a corner point for placement of diagonally cut workpieces.

6. A tool for positioning door trim strips on door frames and further for holding the trim strips at a predetermined distance from the edge of a door frame during installation, comprising:

a trim guide portion, including a first guide rail and a second guide rail separated by a trim width spacing portion such that the door trim strips fit between the first guide rail and the second guide rail, which fits loosely over a segment of trim strip and acts to prevent the trim strip from moving in one specific dimension relative to the tool;

a door frame edge guide portion affixed to an outer side of the first guide rail and in a parallel plane therewith, adapted to be placed in abutment to the edge of a door frame to position the tool itself; and a spacer portion separating the door frame edge guide portion and an inner edge of the trim guide portion for positioning the inner edge of the trim guide portion at the predetermined distance from said door frame edge guide portion, the predetermined distance being selected to be equal to that customarily utilized as a setback spanning the building trade".

7. The tool of claim 6 wherein the trim guide portion includes a first side wall for abutting against a lateral edge of said segment of trip strip, a second side wall arrayed opposite said first side wall, said second side wall for abutting against opposing lateral edge of said segment of trim strip, and spacing means for connecting and separating said first side wall and said second side wall by a trim width span distance approximately equal to the width of said segment of trim strip.

8. The tool of claim 7 wherein said spacing means is in the form of a rigid trim width spacer interconnecting said first and second side walls.

9. A trim and stop positioning device for use with aperture trim as utilized in the building trades, comprising a trim guide for partially enclosing a segment of a strip of aperture trim such that said strip may be held in position on a surface by positioning the trim guide;

an edge guide, affixed to the trim guide for extending perpendicularly therefrom over an edge of said surface such that the trim guide is spaced a constant distance from said edge when the edge guide is held in abutment to said edge; and a wall guide attached to the trim guide opposite the edge guide, said wall guide adapted to abut against said surface to aid in the support of said segment."

10. The device of claim 9 and further including a headpiece marking element affixed to the edge guide for facilitating marking headpiece span separation positions and corner location positions.

11. The device of claim 10 wherein said headpiece marking element is in the form of an elongated bar extending across the edge guide and protruding beyond each lateral edge thereof by said constant distance.

12. The device of claim 11 wherein said elongated bar is spaced from the longitudinal edge of the edge guide by a preselected stop setback span.

13. The device of claim 9 wherein the device is a unitarily constructed solid member.

14. The device of claim 9 wherein the trim guide includes a first wall for abutting against one edge of said segment, a second wall for abutting against the opposing edge of said segment and a width spacer for interconnecting and spacing said first wall and said second wall.

15. The device of claim 14 wherein said width spacer is in the form of a solid plate extending between said first wall and said second wall at a position displaced from one edge thereof such that said segment may fit into a cavity formed by said width spacer, said first wall and said second wall.

* * * * *